(12) United States Patent
McDonald et al.

(10) Patent No.: US 7,993,615 B1
(45) Date of Patent: Aug. 9, 2011

(54) INTEGRATED FLUE GAS DEHUMIDIFICATION AND WET COOLING TOWER SYSTEM

(75) Inventors: Dennis K. McDonald, Massillon, OH (US); Douglas J. Devault, Rootstown, OH (US); Vladimir Vaysman, Cumru, PA (US)

(73) Assignee: Babcock & Wilcox Power Generation Group, Inc., Barberton, OH (US)

( * ) Notice: Subject to any disclaimer, the term of this patent is extended or adjusted under 35 U.S.C. 154(b) by 0 days.

(21) Appl. No.: 12/830,850

(22) Filed: Jul. 6, 2010

(51) Int. Cl.
*B01D 53/34* (2006.01)
*B01D 53/74* (2006.01)

(52) U.S. Cl. .......... 423/210; 422/168; 422/187; 95/229; 95/231

(58) Field of Classification Search ................. 423/210; 422/168, 187; 95/229, 231
See application file for complete search history.

(56) References Cited

U.S. PATENT DOCUMENTS

| | | | | |
|---|---|---|---|---|
| 3,927,176 | A | * | 12/1975 | Turnbo et al. ................. 423/210 |
| 4,933,162 | A | * | 6/1990 | Vansant et al. ................ 423/488 |
| 5,001,095 | A | * | 3/1991 | Sechrist .......................... 502/41 |
| 7,585,476 | B2 | * | 9/2009 | Downs et al. ................. 423/210 |

* cited by examiner

*Primary Examiner* — Timothy Vanoy
(74) *Attorney, Agent, or Firm* — Michael J. Seymour; Eric Marich

(57) ABSTRACT

A method and system for dehumidifying flue gas from a flue gas generating. Water is supplied from a cooling tower to a heat exchanger in the liquid in the lower end of a wet flue gas processor for cooling the liquid in the lower end of the wet flue gas processor to condense water from the flue gas into the liquid in the wet flue gas processor. Returning water from the heat exchanger to the cooling tower cools the water and the liquid with the condensed water is supplied from the wet flue gas processor to the cooling tower as make-up water for the cooling tower to reduce or eliminate the need for fresh make-up water.

20 Claims, 1 Drawing Sheet

INTEGRATED FLUE GAS DEHUMIDIFICATION AND WET COOLING TOWER SYSTEM

FIELD AND BACKGROUND OF THE INVENTION

The present invention relates generally to the field of flue gas treatment for boilers, and in particular to a new and useful method and apparatus for more efficient wet cooling of boiler exhaust gases, and more particularly to providing cooling water for dehumidification of boiler flue gasses even in areas where water is scarce.

In order to remove moisture from flue gas, for example for oxy-combustion, regenerable solvent advanced technology (RSAT™) scrubber, or other carbonaceous fuel burning or flue gas treatment process, one method is to use quench cooling and to control the spray water temperature to achieve the desired outlet gas saturation temperature. One such method is taught by U.S. Pat. No. 7,585,476 but this concept could be applied to any method that cools flue gas to remove a constituent such as water by controlling the saturation temperature. U.S. Pat. No. 7,585,476 is incorporated herein by reference.

In current approaches, a cooling tower is used to cool the water used within a quench cooler cooling surface. It is known in the industry that wet evaporative cooling is less costly and more effective than dry cooling but it requires a significant amount of water which is evaporated to dissipate the heat removed from the cooling water. The present invention takes advantage of the water condensed from the flue gas within the quench cooler by using it in the wet cooling tower as make-up for evaporation.

SUMMARY OF THE INVENTION

It is an object of the present invention to provide a method and system for dehumidifying flue gas from a flue gas generating process that supplies the flue gas to a wet flue gas processor having a lower end from which liquid in the wet flue gas processor is supplied to an upper end of the wet flue gas processor for spraying liquid onto flue gas in the wet flue gas processor. A wet cooling tower supplies water to a heat exchanger in the liquid in the lower end of the wet flue gas processor for cooling the liquid in the lower end of the wet flue gas processor to condense water from the flue gas into the liquid in the wet flue gas processor. Returning water from the heat exchanger to the cooling tower cools the water and the liquid with the condensed water from the wet flue gas processor is supplied as make-up water to the cooling tower.

The invention provides a more effective, i.e. lower cost and higher performance, dehumidification system than currently possible and eliminates the need for significant fresh water while permitting more efficient and less costly wet cooling to be used in conjunction with flue gas dehumidification by quench cooling. This invention is applicable wherein flue gas dehumidification is needed and in one embodiment enhances current oxy-combustion and in another embodiment advances post-combustion CO2 technology.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
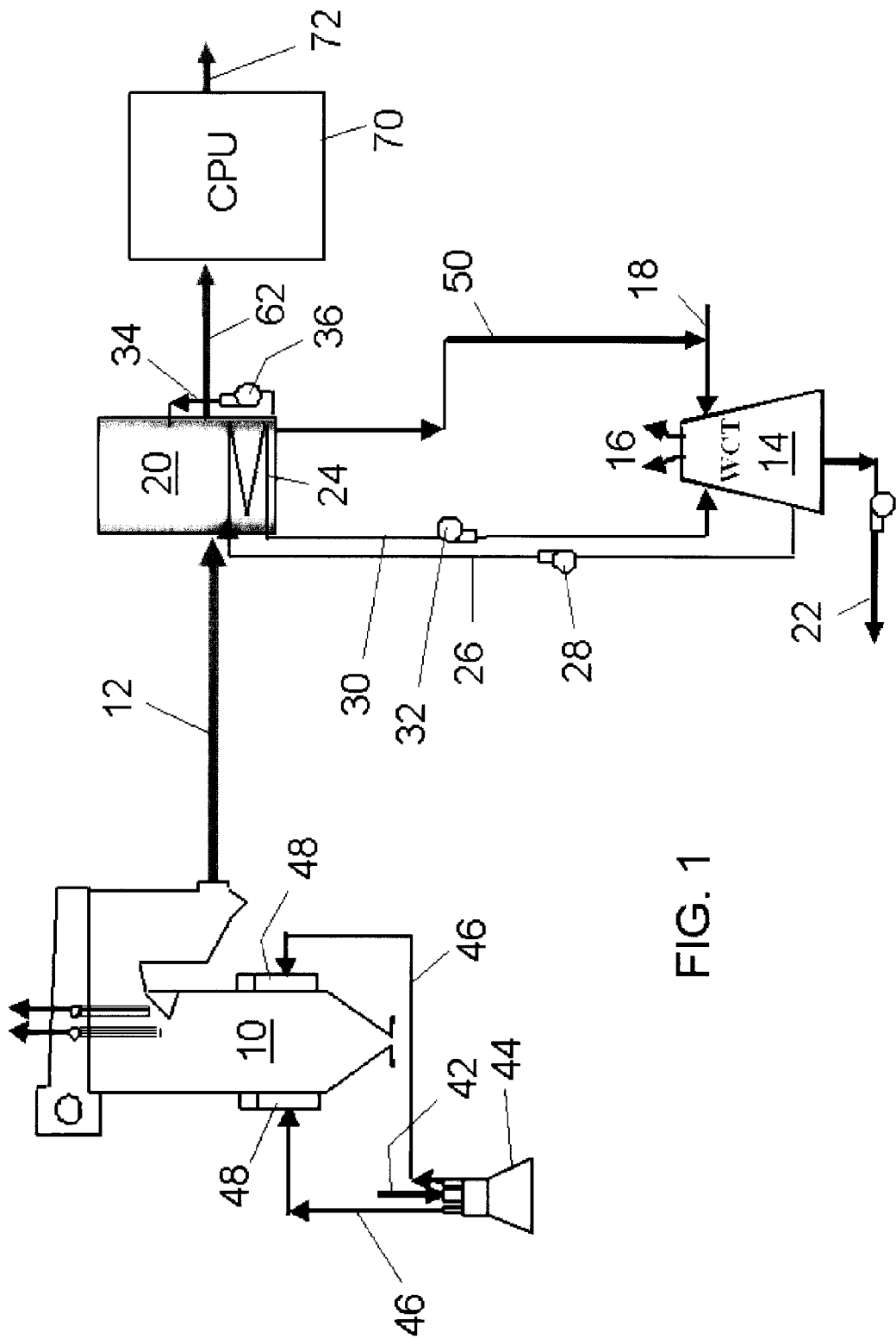
FIG. 1 is a schematic representation of a system for dehumidifying flue gases according to the present invention.

Referring now to the FIG. 1, this illustration shows a system for dehumidifying flue gases 12 from a boiler 10, that uses much less water then was previously needed. The invention actually almost eliminates the need for fresh water make-up to a wet cooling tower 14. Make-up water would otherwise all be needed and supplied into the system at water line 18. By implementing this invention only make-up water for water losses or water that is used to purge solids at purge outlet 22, is needed. This permits wet evaporative cooling to be used even in climates where water is scarce. Because the source of the water is the combustion of the fuel (primarily natural gas or coal), only a very small amount of fresh water make-up is required at water line 18.

One example of how the boiler 10 is fueled is by coal supplied at 42 to a pulverizer 44 and once pulverized, by feed lines 46 to burners 48 of the boiler 10. For an oxy-combustion boiler, CO2 rich flue gas can be recirculated to the boiler and supplied along with oxygen rich gas to burn the fuel in the boiler 10.

In some combustion processes such as oxy-combustion and post-combustion systems, moisture must be removed from the flue gas 12 before sending it to further processing such as in a compression unit. In oxy-combustion it is also advantageous to remove moisture from some or all of the flue gas that is recycled to improve combustion in the boiler 10. This function can be accomplished by controlling the gas temperature leaving a wet scrubber such as a wet flue gas desulfurization (WFGD) scrubber or controlling the water temperature in a quench type cooler. Either the WFGD or the quench type cooler is schematically shown at 20 in FIG. 1 and is generically referred to here as a wet flue gas processor. In either case, the objective is to control the flue gas temperature leaving the flue gas generating device, which flue gas will be saturated, and thus control the moisture content in the flue gas. To control the flue gas temperature, water or, in a wet scrubber, slurry which may also remove other constituents, is cooled by a heat exchanger 24 to the desired temperature before spraying into the flue gas stream.

To cool this spray medium, one method is to insert a closed loop system with a heat transfer coil or heat exchanger 24 submerged in the slurry or water of the wet flue gas processor 20. Cooling water at 26 from the wet cooling tower 14 is pumped by pump 28 through the heat transfer coil 24 to cool the slurry or water it is submerged in. The cooling water absorbs heat from the slurry or water in the bottom of the wet flue gas processor tower and the hot cooling water at 30 is pumped by pump 32 back to the wet cooling tower 14 where it is cooled by evaporative cooling 16 before recirculating again. The slurry or water at 34 is pumped by pump 36 to the top of the WFGD or quench cooler 20 and sprayed into the incoming gas from flue gas line 12 and collected in the bottom of the tower 20.

The amount of water condensed in the WFGD or quench cooler 20 is determined by how much the adiabatic saturation temperature is reduced. The amount of heat that must be removed to achieve the reduced temperature is the latent heat of vaporization plus the sensible heat in the gas. Thus the amount of water condensed from the flue gas in the WFGD or quench cooler 20 defines the amount of heat that must be removed from the flue gas 12 to achieve that degree of condensation. Likewise, the amount of heat that must be removed from the cooling water in the wet cooling tower defines the amount of water evaporated at 16 to achieve that degree of cooling. Since the heat being absorbed in the WFGD or quench cooler 20 is essentially exactly the same amount of heat being removed in the wet cooling tower 14, the amount of water condensed on line 50 from the WFGD or quench cooler 20, will be essentially equal to the amount of water that will be evaporated at 16 in the wet cooling tower 14. By pumping the water on line 50 condensed in the WFGD or quench cooler 20 to the fresh water make-up line 18 for the WCT 14, no additional fresh water would be required ideally. Since there is likely to be some solids in the stream, the WCT 14 will require a water containing purge 22 to control solids concentration. To compensate for the purge stream and any other possible water losses such as by evaporation at 16, some fresh water make-up will likely be introduced at water line 18 but much less than would otherwise be necessary.

If the system employs a quench cooler using water, the solids will be negligible and the fresh make-up very low. If a WFGD is used, the amount of WCT purge will depend upon the reagent being used and some reagents may not work because they would foul the WCT 14 too severely.

Dehumidified flue gas leaves flue gas processor 20 on line 62 and is supplied to a downstream unit 70 that may be a CO2 compression and purification unit (CPU) if the boiler 10 is operated as an oxy-combustion boiler, or a post combustion CO2 capture unit, and then is supplied on line 72 to EOR or storage.

While a specific embodiment of the invention has been shown and described in detail to illustrate the application of the principles of the invention, it will be understood that the invention may be embodied otherwise without departing from such principles.

What is claimed is:

1. A method for dehumidifying flue gas from a flue gas generating process, comprising:
   supplying the flue gas from the flue gas generating process to a wet flue gas processor having a lower end from which liquid in the wet flue gas processor is supplied to an upper end of the wet flue gas processor for spraying liquid onto flue gas in the wet flue gas processor;
   providing a wet cooling tower;
   supplying water from the cooling tower to a heat exchanger in the liquid in the lower end of the wet flue gas processor for cooling the liquid in the lower end of the wet flue gas processor to condense water from the flue gas into the liquid in the wet flue gas processor;
   returning the water from the heat exchanger to the cooling tower for cooling the water in the cooling tower before it is returned to the wet flue gas processor; and
   supplying liquid including with the condensed water from the wet flue gas processor as make-up water to the cooling tower.

2. The method of claim 1, wherein the flue gas generating process comprises the combustion of carbonaceous material in a boiler.

3. The method of claim 1, wherein the flue gas generating process comprises the oxy-combustion of carbonaceous material in a boiler.

4. The method of claim 1, wherein the liquid in the wet flue gas processor is slurry containing solids, the method including purging solids that reach the cooling tower from the wet flue gas processor, from the cooling tower with some of the water from the cooling tower and adding make-up water to the cooling tower to replace the water purged with the solids.

5. The method of claim 1, including pumping the water at least one of to and from the cooling tower, and from and to the wet flue gas processor respectively.

6. The method of claim 1, wherein the liquid in the wet flue gas processor is slurry.

7. The method of claim 1, wherein the liquid in the wet flue gas processor is slurry and including pumping the slurry from the lower end to the upper end of the wet flue gas processor.

8. The method of claim 1, wherein the liquid in the wet flue gas processor is slurry containing solids, the method including purging solids that reach the cooling tower from the wet flue gas processor from the cooling tower with some of the water from the cooling tower, adding make-up water to the cooling tower to replace the water purged with the solids, and pumping the slurry from the lower end to the upper end of the wet flue gas processor.

9. The method of claim 1, wherein the wet flue gas processor is a wet flue gas desulfurization unit.

10. The method of claim 1, wherein the wet flue gas processor is a quench cooler.

11. The method of claim 1, including removing an amount of heat by supplying water to the heat exchanger to achieve a reduced temperature to a latent heat of vaporization plus a sensible heat in the flue gas.

12. The method of claim 1, including removing an amount of heat from the cooling tower by evaporating water from the cooling tower.

13. The method of claim 1, including removing an amount of heat by supplying water to the heat exchanger to achieve a reduced temperature in the flue gas to a latent heat of vaporization plus a sensible heat in the flue gas and removing the same amount of heat from the cooling tower by evaporating water from the cooling tower.

14. The method of claim 1, including supplying dehumidified flue gas for the wet flue gas processor to a downstream unit for one of: CO2 compression and purification for oxy-combustion; and for post combustion CO2 capture.

15. A system for dehumidifying flue gas from a flue gas generating process, comprising:
   a wet flue gas processor for receiving flue gas from the flue gas generating process and having a lower end from which liquid in the wet flue gas processor is supplied to an upper end of the wet flue gas processor for spraying liquid onto flue gas in the wet flue gas processor;
   a heat exchanger in the liquid in the lower end of the wet flue gas processor;
   a wet cooling tower;
   means for supplying water from the cooling tower to the heat exchanger in the liquid in the lower end of the wet flue gas processor for cooling the liquid in the lower end of the wet flue gas processor to condense water from the flue gas and into the liquid in the wet flue gas processor;
   means for returning the water from the heat exchanger to the cooling tower for cooling the water in the cooling tower before it is returned to the wet flue gas processor; and
   means for supplying liquid with the condensed water from the wet flue gas processor to the cooling tower.

16. The system of claim 15, including a carbonaceous material burning boiler connected to the wet flue gas processor and for generating the flue gas.

17. The system of claim 15, wherein the flue gas generating process comprises the oxy-combustion boiler.

18. The system of claim 15, wherein the liquid in the wet flue gas processor is slurry containing solids and including means for purging the solids from the cooling tower with some of the water from the cooling tower and adding make-up water to the cooling tower to replace the water purged with the solids.

19. The system of claim 15, including a pump for pumping the water at least one of to and from the cooling tower, and respectively from and to the wet flue gas processor.

20. The system of claim 15, wherein the liquid in the wet flue gas processor is slurry containing solids, the system including means for purging the solids from the cooling tower with some of the water from the cooling tower and adding make-up water to the cooling tower to replace the water purged with the solids and a pump for pumping the slurry from the lower end to the upper end of the wet flue gas processor.

* * * * *